United States Patent
Takahashi et al.

(10) Patent No.: US 12,169,244 B2
(45) Date of Patent: Dec. 17, 2024

(54) MOBILE BODY CONTROL DEVICE AND MOBILE BODY CONTROL METHOD

(71) Applicant: SONY GROUP CORPORATION, Tokyo (JP)

(72) Inventors: Yusuke Takahashi, Tokyo (JP); Masataka Toyoura, Tokyo (JP); Ryo Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 290 days.

(21) Appl. No.: 17/623,813

(22) PCT Filed: Jul. 1, 2020

(86) PCT No.: PCT/JP2020/025784
§ 371 (c)(1),
(2) Date: Dec. 29, 2021

(87) PCT Pub. No.: WO2021/006138
PCT Pub. Date: Jan. 14, 2021

(65) Prior Publication Data
US 2022/0244401 A1    Aug. 4, 2022

(30) Foreign Application Priority Data
Jul. 10, 2019    (JP) ................. 2019-128092

(51) Int. Cl.
*G01S 19/22*    (2010.01)
*G01C 21/20*    (2006.01)
(Continued)

(52) U.S. Cl.
CPC .............. *G01S 19/22* (2013.01); *G01C 21/20* (2013.01); *G05D 1/106* (2019.05); *B64U 10/13* (2023.01); *B64U 30/26* (2023.01); *B64U 2201/20* (2023.01)

(58) Field of Classification Search
CPC ......... G01S 19/22; G01C 21/20; G01C 23/00; G05D 1/106; G05D 1/101; B64U 10/13; B64U 30/26; B64C 13/20
See application file for complete search history.

(56) References Cited

U.S. PATENT DOCUMENTS 8,077,091 B1 *  12/2011  Guigne ................. G01S 5/0215
                                                        342/465
10,116,381 B1 *  10/2018  Smyth .................. H04B 17/318
(Continued)

FOREIGN PATENT DOCUMENTS

CN    101160535 A    4/2008
CN    102540205 A    7/2012
(Continued)

OTHER PUBLICATIONS

International Search Report and Written Opinion of PCT Application No. PCT/JP2020/025784, issued on Sep. 29, 2020, 12 pages of ISRWO.
(Continued)

*Primary Examiner* — Mary Cheung
(74) *Attorney, Agent, or Firm* — CHIP LAW GROUP

(57) ABSTRACT

The influence of multipath on the positioning calculation based on positioning signals transmitted from satellites is reduced. A self-position is estimated using a positioning calculation result based on a positioning signal transmitted from a satellite. Movement of a mobile body is controlled on the basis of the estimated self-position. A multipath reduction action signal is output when the mobile body is in a multipath environment. The mobile body is controlled so as to take a multipath reduction action when the mobile body is in a predetermined movement state and the multipath reduction action signal is output.

7 Claims, 13 Drawing Sheets

(51) Int. Cl.
*G05D 1/00* (2006.01)
*B64U 10/13* (2023.01)
*B64U 30/26* (2023.01)

(56) References Cited

U.S. PATENT DOCUMENTS

| | | | | |
|---|---|---|---|---|
| 2008/0166011 | A1* | 7/2008 | Sever | G01S 19/28 |
| | | | | 382/100 |
| 2010/0135178 | A1* | 6/2010 | Aggarwal | H04W 24/00 |
| | | | | 370/252 |
| 2012/0119951 | A1* | 5/2012 | Vollath | G01C 15/00 |
| | | | | 342/357.61 |
| 2014/0225771 | A1* | 8/2014 | Phuyal | G01S 19/485 |
| | | | | 342/357.28 |
| 2016/0088429 | A1* | 3/2016 | Gao | G01S 5/0045 |
| | | | | 455/456.1 |
| 2018/0267545 | A1* | 9/2018 | Goto | G05D 1/0255 |
| 2018/0288713 | A1* | 10/2018 | Kosseifi | H04W 52/0212 |

FOREIGN PATENT DOCUMENTS

| | | |
|---|---|---|
| DE | 112006000941 T5 | 3/2008 |
| DE | 102011086385 A1 | 5/2012 |
| JP | 2000-266836 A | 9/2000 |
| JP | 2001-289652 A | 10/2001 |
| JP | 3827598 B2 * | 9/2006 |
| JP | 4271879 B2 * | 6/2009 ............ G01S 19/42 |
| JP | 2011-220740 A | 11/2011 |
| JP | 2018238304 | 12/2018 |
| JP | 2020101391 A * | 7/2020 |
| WO | 2006/113689 A2 | 10/2006 |

OTHER PUBLICATIONS

Taro Suzuki, "Chapter 1 GNSS Signals and Positioning Mechanism, Positioning error factor, ingenuity to improve positioning accuracy, application to autonomous driving and drones, etc. Multi-GNSS satellite positioning technology and application to robots", RF World, Feb. 1, 2019, pp. 8-23.

Nobuaki Kubo, "8.Multipath error and reduction method", Asakura Publishing Co. Ltd., Sep. 25, 2010, pp. 208-221.

* cited by examiner

MOBILE BODY CONTROL DEVICE AND MOBILE BODY CONTROL METHOD

CROSS REFERENCE TO RELATED APPLICATIONS

This application is a U.S. National Phase of International Patent Application No. PCT/JP2020/025784 filed on Jul. 1, 2020, which claims priority benefit of Japanese Patent Application No. JP 2019-128092 filed in the Japan Patent Office on Jul. 10, 2019. Each of the above-referenced applications is hereby incorporated herein by reference in its entirety.

TECHNICAL FIELD

The present technology relates to a mobile body control device, a mobile body control method and a program, and more particularly to a mobile body control device and the like that reduce the influence of multipath on positioning calculation.

BACKGROUND ART

GNSS (Global Navigation Satellite System), for example GPS (Global Positioning System), is expected to be used in various autonomous mobile bodies as a system capable of grasping an absolute position with small size, light weight, and low power consumption. Many of the drones that are being developed as one of the platforms for autonomous mobiles are small and have a low payload, and it can be said that GPS is an indispensable sensor for self-position estimation.

GPS is a system that measures the distance from each satellite on the basis of signals from the satellites and calculates its own position according to the principle of triangulation using the distance. Therefore, when signals are received, if a phenomenon called multipath occurs in which not only direct waves but also reflected waves and diffracted waves reach an antenna at the same time, distance measurement processing is performed with noise added to the signals from satellites. Therefore, a distance measurement error occurs, and an error occurs in the final positioning result. In order to improve the accuracy and stability of GPS, how to eliminate a multipath error is the key.

In the prior art, there are many passive methods that reduce the influence of multipath after receiving a multipath signal. For example, a method of making it difficult to receive multipath signals by devising the hardware of an antenna, a method of selecting a satellite to be used for positioning according to an index such as signal intensity, and a method of making it difficult to receive multipath signals in a correlation waveform at the stage of correlation processing may be used. On the other hand, there is no multipath reduction method that actively makes it difficult to receive multipath signals.

For example, PTL 1 discloses a technique in which the correlation processing is performed using a narrow correlator which is considered to be strong against multipath when the signal intensity is high, and the correlation processing is performed using a wide correlator since the signal cannot be captured using a narrow correlator when the signal intensity is low. In this way, the positioning rate is improved while reducing the multipath error in an environment where the signal intensity is high. This technique has no effect when the multipath signal dominates the direct wave.

For example, PTL 2 discloses a technique of dynamically adjusting a correlator width of a delay lock loop (DLL) that performs correlation processing according to the moving speed of a GNSS receiver to compensate for a multipath error without adding hardware. This technique focuses on the feature that reflected waves and diffracted waves are delayed with respect to direct waves. This technique has no effect on satellite signals affected by other multipaths because it only cuts low-elevation satellites when stopped.

CITATION LIST

Patent Literature

[PTL 1]
    JP 2011-220740 A
[PTL 2]
    JP 2000-266836 A

SUMMARY

Technical Problem

An object of the present technology is to reduce the influence of multipath on the positioning calculation based on positioning signals transmitted from satellites.

Solution to Problem

The concept of the present technology is a mobile body control device including: a self-position estimation unit that estimates a self-position using a positioning calculation result based on a positioning signal transmitted from a satellite; a movement control unit that controls movement of a mobile body on the basis of the self-position; and a multipath reduction action signal output unit that outputs a multipath reduction action signal when the mobile body is in a multipath environment, wherein the movement control unit controls the mobile body so as to take a multipath reduction action when the mobile body is in a predetermined movement state and the multipath reduction action signal is output.

In the present technology, the self-position estimation unit estimates a self-position using a positioning calculation result based on a positioning signal transmitted from a satellite. The movement control unit controls movement of a mobile body on the basis of the self-position. The reduction action signal output unit outputs a multipath reduction action signal when the mobile body is in a multipath environment. In this case, the mobile body is controlled so as to take a multipath reduction action when the mobile body is in a predetermined movement state and the multipath reduction action signal is output.

For example, the mobile body control device may further include an environment confirmation unit that outputs obstacle information on surrounding obstacles, and the movement control unit may change the multipath reduction action on the basis of the obstacle information. In this case, for example, the mobile body may be a drone, the predetermined movement state may be hovering, and the multipath reduction action may be either turning, spiral, or vertical movement.

As described above, in the present technology, the mobile body is controlled so as to take a multipath reduction action when the mobile body is in the predetermined movement state and the multipath reduction action signal is output. Therefore, the influence of multipath on the positioning calculation based on the positioning signal transmitted from the satellite can be reduced, the self-position estimation is performed stably, and the stable movement of the mobile body can be realized.

In the present technology, for example, the mobile body control device may further include a mode setting unit that sets a mode in which the reduction action signal output unit can output the multipath reduction action signal when the mobile body is in the multipath environment. In this case, it is possible to take a multipath reduction action according to the mode setting. In the present technology, for example, the mobile body control device may further include a user notification unit that notifies a user to confirm whether the reduction action signal output unit will output the multipath reduction action signal when the mobile body is in the multipath environment. In this case, it is possible to take a multipath reduction action on the basis of the confirmation of the user.

DESCRIPTION OF EMBODIMENTS

Hereinafter, modes for carrying out the present invention (hereinafter referred to as embodiments) will be described. The description will be made in the following order.

1. Embodiment
2. Modification

1. Embodiment

[Prerequisite Technology]

Figure 1:
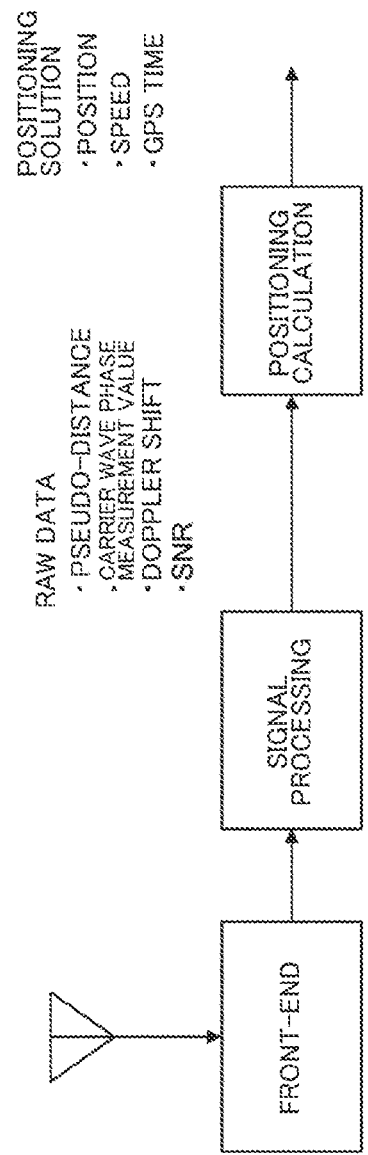
FIG. 1 is a diagram showing an outline of a configuration of a GNSS receiver.

The technology that is the premise of the present technology will be described. FIG. 1 shows an outline of the configuration of a GNSS receiver. There are roughly three processes before a GNSS receiver determines its own position. A front-end portion performs processing of receiving and amplifying satellite signals using an antenna. A signal processing unit performs signal processing for obtaining distance measurement information necessary for positioning. A positioning calculation processing unit performs a positioning calculation process for calculating its own position using a pseudo-distance is performed.

In the present technology, attention is paid to the characteristics of signal processing in the signal processing unit. Here, the outline of the process of obtaining the distance from the satellite after receiving the satellite signal (positioning signal) will be described. The receiver compares a received code with a sample code stored therein, obtains the difference between the timing when the satellite sends a signal and the timing when the receiver receives the same, and obtains the distance from the satellite from the time difference.

Figure 2A:
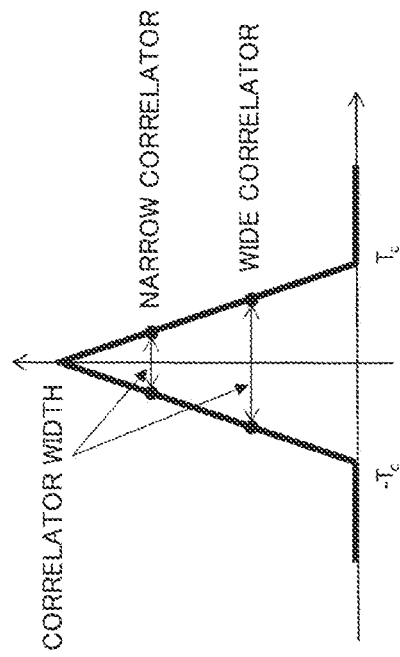
FIGS. 2A and 2B are diagrams for explaining correlation processing.

As shown in FIG. 2A, a correlation value is obtained while shifting the sample code in the time direction with respect to the received code, and the time when the correlation reaches its peak is obtained. In this way, since the time when the satellite transmitted the signal is known, the distance from the satellite can be obtained by multiplying it with the speed of light. The distance from the satellite obtained here is called a pseudo-distance, and the pseudo-distance is used in the positioning calculation processing in the subsequent stage. The receiver can track the satellite signal and perform continuous positioning by continuously capturing the peak obtained by the correlation processing using a delay lock loop (DLL).

Since the correlation waveform contains noise, the averaging process is performed using the correlation waveform for a certain period of time before the correlation process is performed. By performing the averaging process, the influence of the noise component in the correlation waveform is reduced. The receiver calculates the peak using the correlation waveform after the averaging process. A correlator is used to calculate the peak.

A correlator with a wide correlator width is called a wide correlator, and a correlator with a narrow correlator width is called a narrow correlator. However, since the signal tracking by the delay lock loop is likely to be lost, it may not be possible to capture the satellite itself. Therefore, it is not enough to use a narrow correlator to reduce multipath.

Figure 2B:
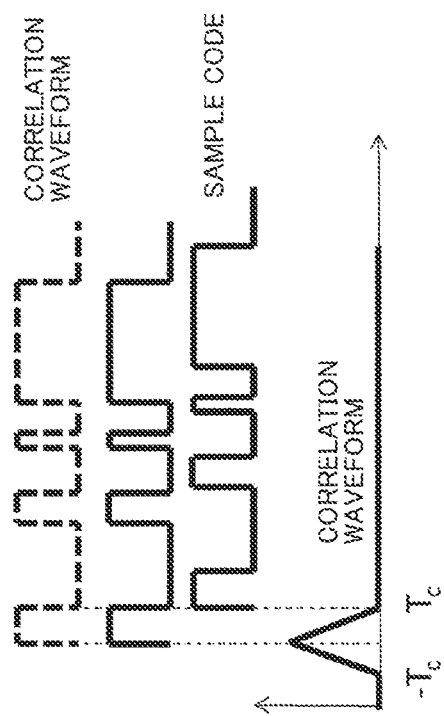

As shown in FIG. 2B, the correlator finds two points, a phase lead portion and a phase lag portion, in which the correlation is smaller than the peak. The center position of the two points is used as the peak position for distance measurement. If it is an ideal correlation waveform or a correlation waveform having a multipath component outside the correlator width as shown in FIG. 3A, the center of the two points coincides with the peak.

Figure 3B:
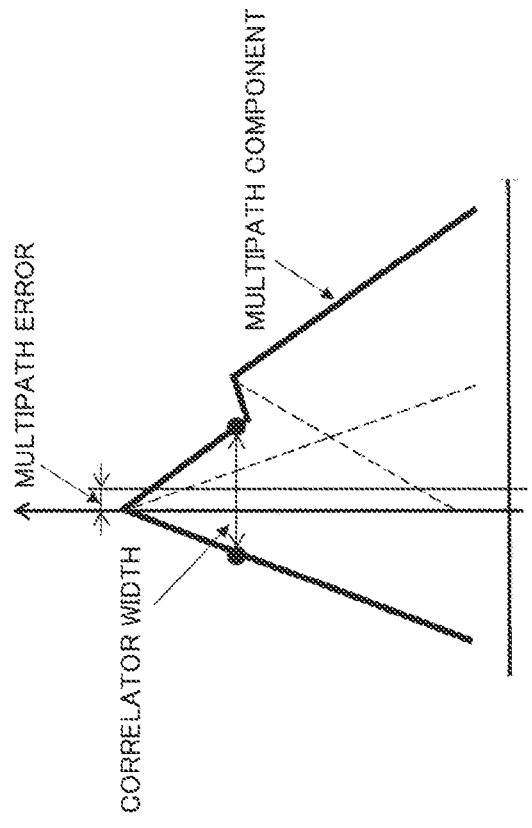
FIGS. 3A and 3B are diagrams for explaining correlation processing when there is multipath.
Figure 3A:
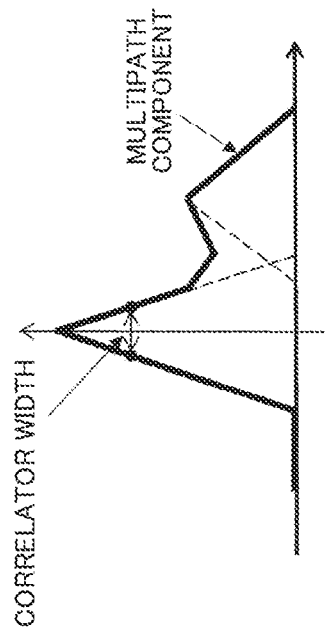

However, as shown in FIG. 3B, when the multipath component in the correlation waveform is inside the correlator width, the center between the two points deviates from the true autocorrelation peak, and the deviation (multipath error) is the distance measurement error in multipath. In the present technology, a method of suppressing the multipath component from entering the inside of the two points obtained by the correlator is proposed.

[Basic Ideal]

Figure 4:
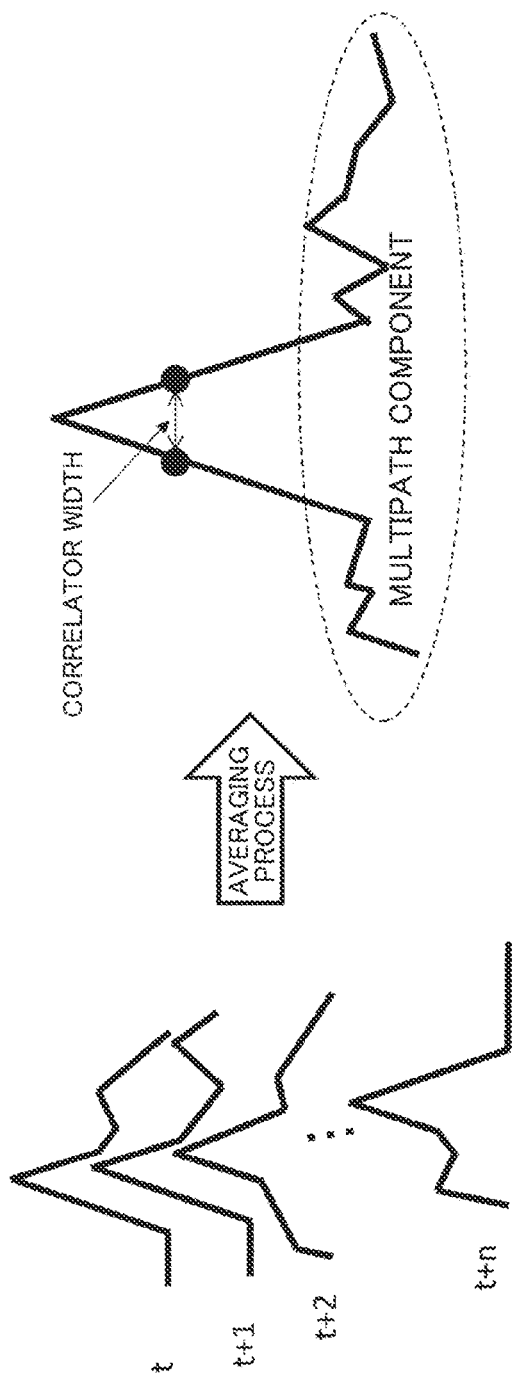
FIG. 4 is a diagram for explaining the reduction of multipath components in a correlation waveform by an averaging process.

The basic idea of the present technology will be explained. As shown in FIG. 4, if the appearances of the multipaths of the correlation waveforms having different acquisition times used in the averaging process are different, the influence of the multipaths is reduced by the averaging process. This is because the multipath component is equalized by the averaging process and the true correlation part is emphasized.

Strictly speaking, if the averaging time is longer than the time when the phase changes by half a wavelength, the multipath is equalized by the averaging process, and the influence of the multipath is reduced. This can be rephrased that the influence of multipath decreases when the relative phase change between the direct wave and the reflected wave is fast. When the receiver moves, the relative phase change becomes faster. Therefore, in an environment where multipath is likely to enter (hereinafter, appropriately referred to as "multipath environment"), a moving receiver is less affected by multipath than a stopped receiver. The present technology is based on this idea.

Figure 5B:
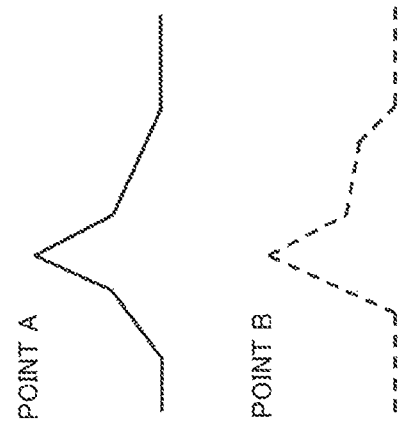
FIGS. 5A and 5B are diagrams showing a basic idea image of the present technology.
Figure 5A:
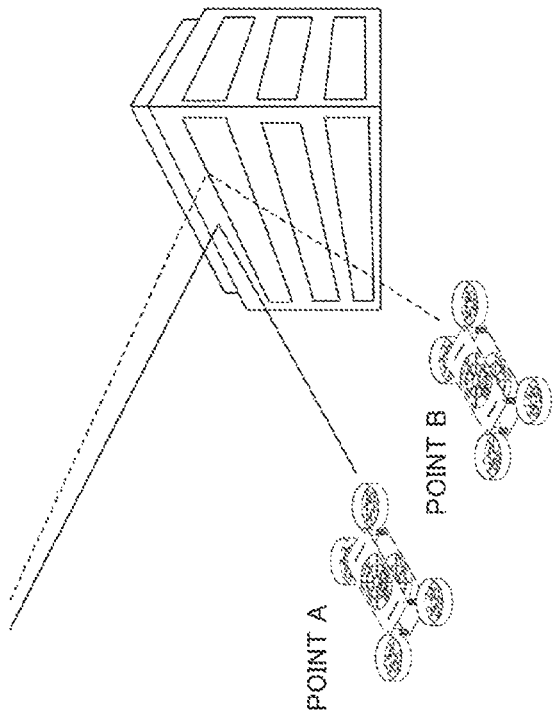

For example, as shown in FIG. 5A, when a drone is hovering near a building, the influence of multipath can be reduced by the averaging process when the drone is moving so that the reception environment changes rather than when it is stationary. If it is stationary, it will continue to receive multipath having passed through the same path, so even if the averaging process is performed, the multipath component will appear strongly in the correlation waveform.

However, when the multipath reception path continues to change, the correlation of the multipath at each time becomes weak, as shown by the correlation waveforms of points A and B in FIG. 5B, for example. Therefore, the multipath component is equalized by the averaging process of the correlation waveforms, and the influence of the multipath component on the correlation waveform is weakened. That is, since the multipath component inside the correlator width also decreases, the calculation accuracy of the peak position is improved, and improvement in the pseudo-distance and the positioning accuracy can be expected.

In the present technology, the movement action that reduces multipath is called a multipath reduction action. As for the movement pattern in the multipath reduction action, turning movement or spiral movement is preferable to linear movement. In the case of linear movement, there may be little change in the multipath route depending on the arrangement of surrounding buildings. Therefore, it is considered that the turning movement or the spiral movement that moves in all directions is more effective than the linear movement so that the movement fits within a circle having a diameter of about 1 m. Also, the faster the movement speed, the higher the effect. However, the minimum effective speed depends on the averaging time of the receiver.

Although it is effective, the route length of the multipath will change to some extent as long as it moves, so it may be combined with an application that makes the drone take action flight. It is also possible to consider applications such as reducing multipath by allowing action flight when stationary.

Configuration Example of Aircraft System

Figure 6:
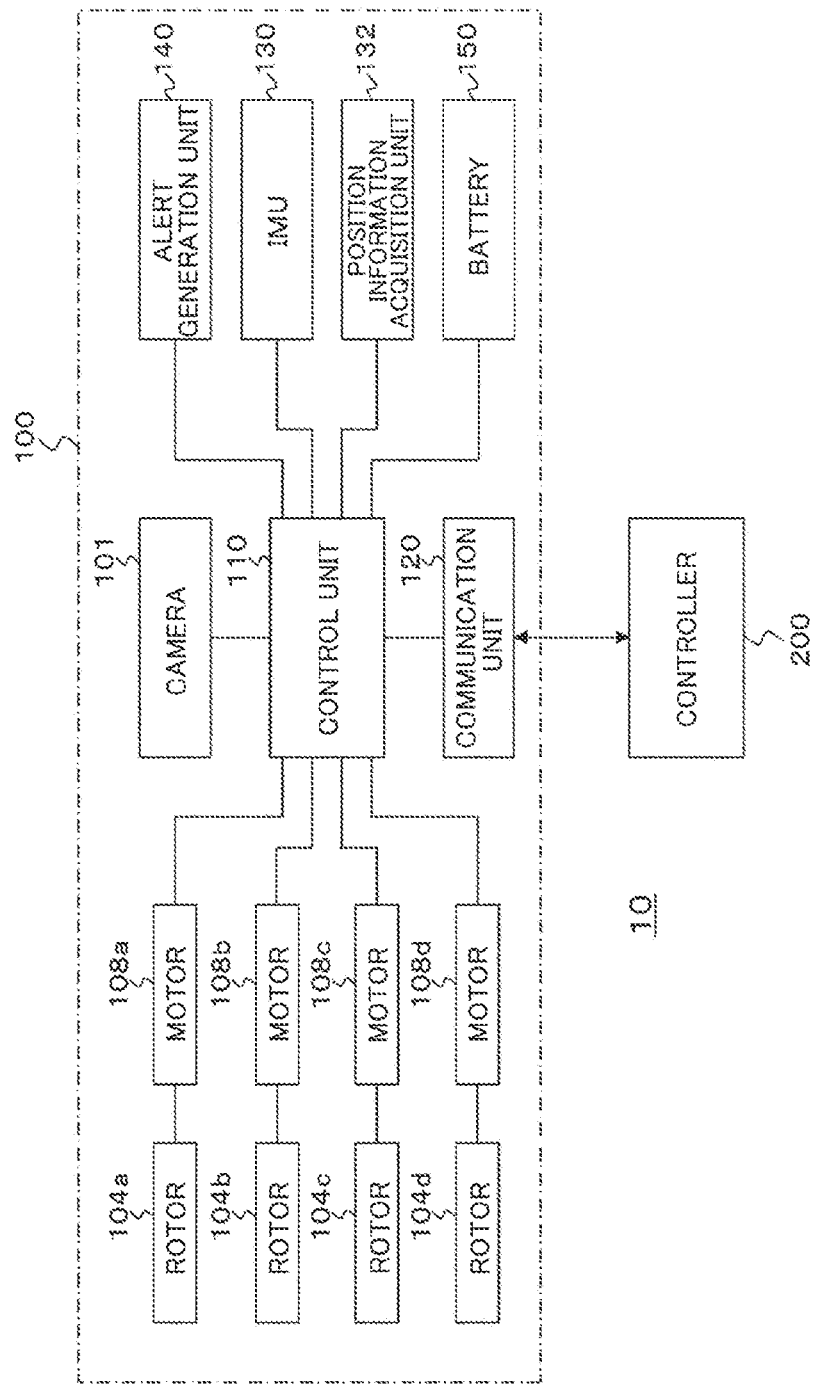
FIG. 6 is a block diagram showing a configuration example of an aircraft system.

FIG. 6 shows a configuration example of an aircraft system 10. The aircraft system 10 includes an aircraft (drone) 100 and a controller 200. The user uses the controller 200 to control the operation of the aircraft 100.

The aircraft 100 includes a camera 101, rotors 104a to 104d, motors 108a to 108d, a control unit 110, a communication unit 120, an IMU 130, a position information acquisition unit 132, an alert generation unit 140, and a battery 150.

The control unit 110 controls the operation of each unit of the aircraft 100. For example, the control unit 110 can control adjustment of the rotation speed of the rotors 104a to 104d by adjusting the rotation speed of the motors 108a to 108d, imaging processing by the camera 101, and transmission and reception of information to and from another device (for example, a controller 200) via the communication unit 120, alert generation processing of the alert generation unit 140, and the like.

The camera 101 includes lenses and an image sensor such as a CCD image sensor or a CMOS image sensor. The rotors 104a to 104d allow the aircraft 100 to fly by generating lift by rotation. The rotation of the rotors 104a to 104d is performed by the rotation of the motors 108a to 108d. The rotation of the motors 108a to 108d can be controlled by the control unit 110.

The communication unit 120 performs information transmission and reception processing by wireless communication with the controller 200. The aircraft 100 transmits an image captured by the camera 101 from the communication unit 120 to the controller 200. The aircraft 100 receives an instruction regarding flight from the controller 200 via the communication unit 120.

The IMU 130 is a sensor unit that integrates sensors for physical information (acceleration sensor, rotational angular acceleration sensor, gyro sensor, and the like) into one package, and can provide the control unit 110 with IMU information, which is information for each sensor, as needed. The position information acquisition unit 132 is, for example, a GPS receiver (see FIG. 1) and acquires information on the current position of the aircraft 100. The position information acquisition unit 132 can provide GPS information including a positioning result, an SNR, and the like to the control unit 110 as needed.

When the aircraft 100 tries to fly beyond a preset flight range, the alert generation unit 140 generates an alert such as sound or light under the control of the control unit 110. The battery 150 stores electric power for operating the aircraft 100. The battery 150 may be a primary battery that can be discharged only or a secondary battery that can be charged.

Information can be transmitted and received between the aircraft 100 and the controller 200 by, for example, wireless communication using the 2.4 GHz band, 5 GHz band, or other frequency bands according to the IEEE 802.11 standard, the IEEE 802.15.1 standard, or other standards.

Figure 7:
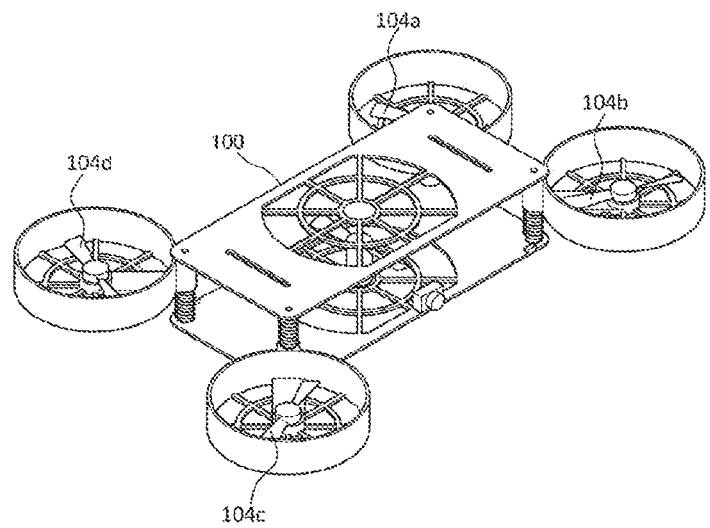
FIG. 7 is a diagram showing an appearance of an example of an aircraft (drone).

FIG. 7 briefly shows the appearance of an example of the aircraft 100. In FIG. 7, the parts corresponding to those in FIG. 6 are designated by the same reference numerals.

First Configuration Example of Aircraft Control Device

Figure 8:
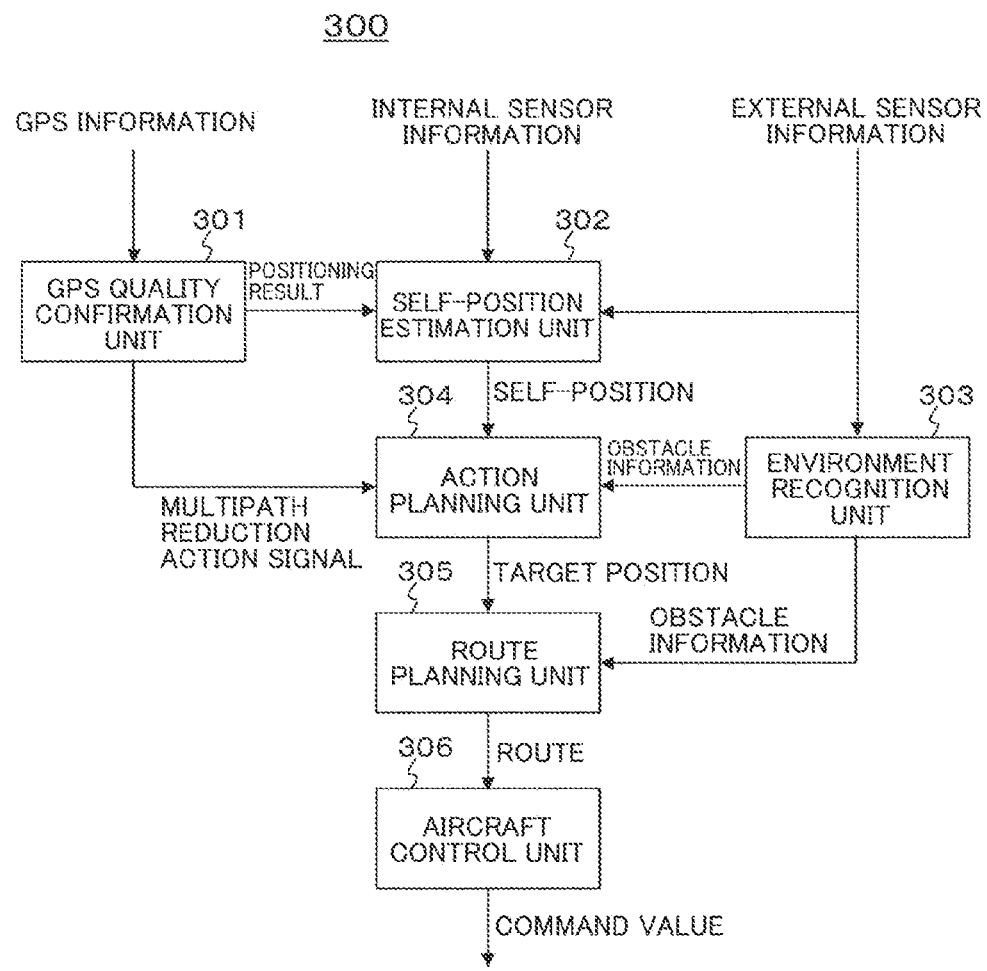
FIG. 8 is a block diagram showing a first configuration example of an aircraft control device.

FIG. 8 shows a configuration example of an aircraft control device 300 included in the control unit 110 of the aircraft (drone) 100. A part or all of the processing of each part in the aircraft control device 300 can be performed by software processing by a computer. The aircraft control device 300 includes a GPS quality confirmation unit 301, a self-position estimation unit 302, an environment recognition unit 303, an action planning unit 304, a route planning unit 305, and an aircraft control unit 306.

GPS information including the positioning result, SNR, and the like acquired by the position information acquisition unit 132 is supplied to the GPS quality confirmation unit 301. The GPS quality confirmation unit 301 sends the positioning result (position, speed, and GPS time) included in the GPS information to the self-position estimation unit 302.

The GPS quality confirmation unit 301 determines whether the aircraft is in a multipath environment (an environment susceptible to multipath). For example, when the SNR (Signal to Noise Ratio) of all satellite signals is low, the GPS quality confirmation unit 301 determines that the aircraft is in the multipath environment. If a satellite that should be visible cannot be captured, or if an upward camera is mounted and the percentage of an empty area is equal to or less than a threshold value, it may be determined that the aircraft is in the multipath environment. When the GPS quality confirmation unit 301 determines that the aircraft is in the multipath environment, it outputs and sends a multipath reduction action signal to the action planning unit 304. In this sense, the GPS quality confirmation unit 301 constitutes a multipath reduction action signal output unit.

The self-position estimation unit 302 is supplied with the internal sensor information and the external sensor information as well as the positioning result from the GPS quality confirmation unit 301. For example, the internal sensor information is acceleration and angular acceleration information from the IMU 130, and the external sensor information is image information from the camera 101. The self-position estimation unit 302 estimates the self-position on the basis of each piece of the supplied information and sends the same to the action planning unit 304. As the external sensor, a laser scanner or the like can be considered in addition to the camera.

The external sensor information is supplied to the environment recognition unit 303. The environment recognition unit 303 determines whether there is an obstacle around the aircraft on the basis of the external sensor information, outputs the determination result as obstacle information, and sends the same to the action planning unit 304 and the route planning unit 305.

The action planning unit 304 is supplied with the multipath reduction action signal output from the GPS quality confirmation unit 301, the self-position estimated by the self-position estimation unit 302, and the obstacle information output from the environment recognition unit 303. The action planning unit 304 outputs the target position on the basis of each piece of the supplied information and sends the same to the route planning unit 305.

Figure 9:
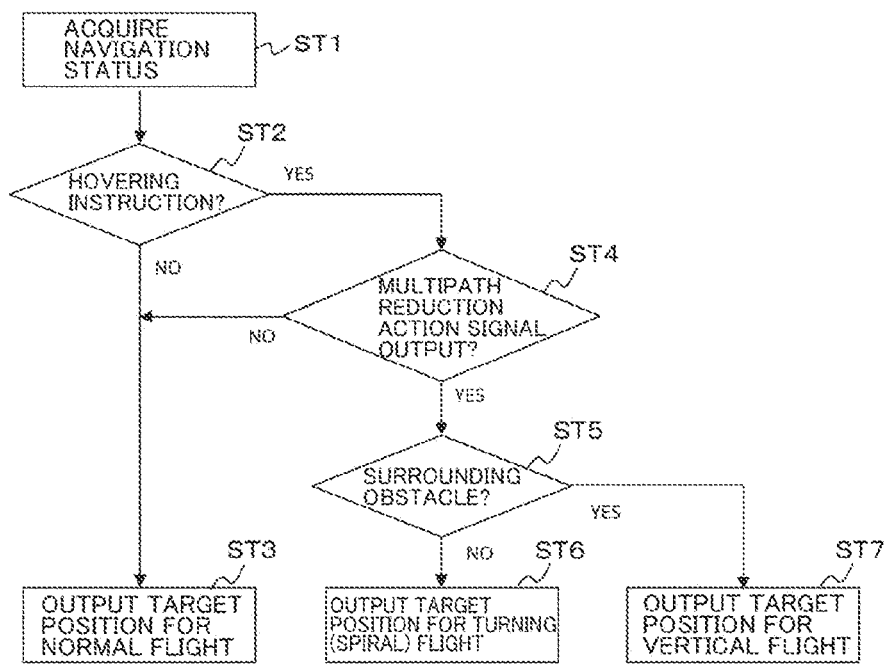
FIG. 9 is a flowchart showing an example of a processing procedure of an action planning unit.

The flowchart of FIG. 9 shows an example of the processing procedure of the action planning unit 304. The action planning unit 304 repeatedly executes the process of this flowchart. In step ST1, the action planning unit 304 acquires the navigation status sent to the aircraft 100, for example, by the user operating the controller 200.

Next, the action planning unit 304 determines in step ST2 whether a hovering instruction (stop instruction) has been issued. This hovering instruction may be an instruction used in internal processing when it is required for autonomous flight as well as the instruction from the user. When the hovering instruction is not issued, the action planning unit 304 outputs the target position for normal flight in step ST3.

When the hovering instruction is issued in step ST2, the action planning unit 304 proceeds to the process of step ST4. In step ST4, the action planning unit 304 determines whether the multipath reduction action signal is output. When the multipath reduction action signal is not output, the action planning unit 304 outputs the target position for normal flight in step ST3.

When the multipath reduction action signal is output in step ST4, the action planning unit 304 proceeds to the process of step ST5. In step ST5, the action planning unit 304 determines whether there is an obstacle around the aircraft on the basis of the obstacle information. When there are no obstacles around the aircraft, the action planning unit 304 outputs the target position for turning flight or spiral flight in step ST6. On the other hand, when there is an obstacle around the aircraft, the action planning unit 304 outputs the target position for vertical flight in step ST7.

Returning to FIG. 8, the route planning unit 305 is supplied with the target position output from the action planning unit 304 and the obstacle information output from the environment recognition unit 303. The route planning unit 305 calculates what kind of route will be drawn with respect to the target position as the route along which the aircraft 100 follows, and sends the same to the aircraft control unit 306. Here, when the route planning unit 305 draws a route, the route planning unit 305 draws the route so as to avoid a sudden obstacle on the basis of the obstacle information.

The route calculated by the route planning unit 305 is supplied to the aircraft control unit 306. The aircraft control unit 306 controls the flight of the aircraft 100, specifically, the rotation and the like of the motors 108a to 108d for rotating the rotors 104a to 104d so as to fly according to the route.

In the aircraft control device 300 shown in FIG. 8, when the hovering instruction is issued and the multipath reducing action signal is output, the aircraft 100 is controlled to take a multipath reduction action (movement action to reduce the multipath). Therefore, it is possible to reduce the influence of multipath on the calculation of the pseudo-distance in the GPS receiver, and therefore the positioning calculation, the self-position estimation is performed stably even in the multipath environment, and stable movement of the aircraft 100 can be realized.

In the aircraft control device 300 shown in FIG. 8, the multipath reduction action when there is no obstacle around the aircraft is controlled to turning or spiral movement, and the multipath reduction action when there is an obstacle around the aircraft is controlled to vertical movement. Therefore, when there is an obstacle around the aircraft, it is possible to avoid an accident in which the aircraft 100 collides with or comes into contact with the obstacle by taking a multipath reduction action.

In the aircraft control device 300 shown in FIG. 8, the multipath reduction action when there is no obstacle around the aircraft is a turning or spiral movement, and the multipath reduction action when there is an obstacle around the aircraft is a vertical movement. However, the method of movement is not limited to this.

It is also conceivable that the movement pattern in the multipath reduction action is the same regardless of the presence of surrounding obstacles.

Second Configuration Example of Aircraft Control Device

Figure 10:
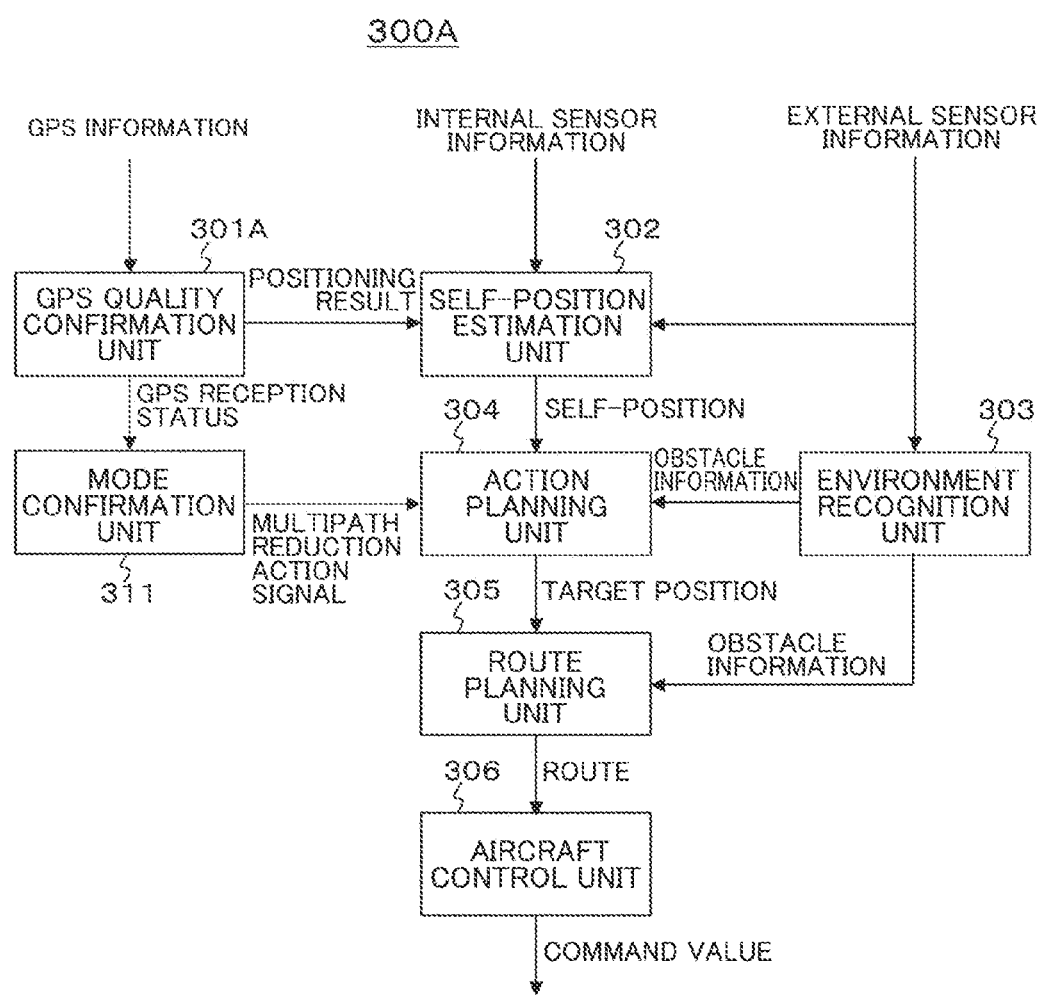
FIG. 10 is a block diagram showing a second configuration example of the aircraft control device.

FIG. 10 shows a configuration example of an aircraft control device 300A included in the control unit 110 of the aircraft (drone) 100. In FIG. 10, the parts corresponding to those in FIG. 8 are designated by the same reference numerals, and detailed description thereof will be omitted as appropriate. The aircraft control device 300A includes a GPS quality confirmation unit 301A, a self-position estimation unit 302, an environment recognition unit 303, an action planning unit 304, a route planning unit 305, an aircraft control unit 306, and a mode confirmation unit 311.

The GPS quality confirmation unit 301 in the aircraft control device 300 of FIG. 8 determines whether the aircraft is in a multipath environment from the GPS reception status (SNR of each satellite signal). If the aircraft is in a multipath environment, the GPS quality confirmation unit 301 outputs and sends a multipath reduction action signal to the action planning unit 304. On the other hand, the GPS quality confirmation unit 301A in the aircraft control device 300A sends the GPS reception status (SNR of each satellite signal) to the mode confirmation unit 311.

The GPS quality confirmation unit 301A supplies the GPS reception status (SNR of each satellite signal) to the mode confirmation unit 311. The mode confirmation unit 301A determines whether the aircraft is in a mode (reduction action mode) capable of outputting a multipath reduction action signal. It should be noted that the user can set or cancel the mode in which the multipath reduction action signal can be output by performing a setting operation using the controller 200 or a direct setting operation on the aircraft 100 (see FIG. 6).

When the mode confirmation unit 311 determines that the reduction action mode is set, the mode confirmation unit 311 determines whether the aircraft is in a multipath environment on the basis of the GPS reception status (SNR of each satellite signal). Then, when the mode confirmation unit 311 determines that the aircraft is in the multipath environment, the mode confirmation unit 311 outputs and sends a multipath reduction action signal to the action planning unit 304. In this sense, the mode confirmation unit 311 constitutes a multipath reduction action signal output unit.

Figure 11:
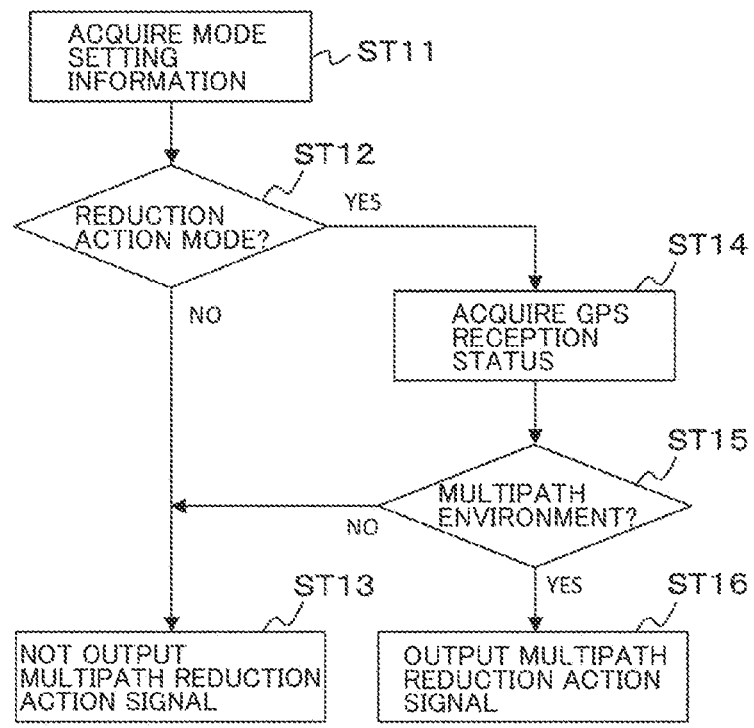
FIG. 11 is a flowchart showing an example of a processing procedure of a mode confirmation unit.

The flowchart of FIG. 11 shows an example of the processing procedure of the mode confirmation unit 311. The mode confirmation unit 311 repeatedly executes the process of this flowchart. The mode confirmation unit 311 acquires mode setting information in step ST11. Next, the mode confirmation unit 311 determines in step ST12 whether the reduction action mode is set. When the reduction action mode is not set, the mode confirmation unit 311 does not output the multipath reduction action signal in step ST13.

On the other hand, when the reduction action mode is set, the mode confirmation unit 311 acquires the GPS reception status supplied from the GPS quality confirmation unit 301A in step ST14. Next, in step ST15, the mode confirmation unit 311 determines whether the aircraft is in a multipath environment on the basis of the GPS reception status (SNR of each satellite signal). If it is determined that the aircraft is not in the multipath environment, the mode confirmation unit 311 does not output the multipath reduction action signal in step ST13. On the other hand, when it is determined that the aircraft is in a multipath environment, the mode confirmation unit 311 outputs a multipath reduction action signal in step ST16.

Returning to FIG. 10, although detailed description is omitted, the other parts of the aircraft control device 300A are configured in the same manner as the aircraft control device 300 of FIG. 8 and operate in the same manner.

In the aircraft control device 300A shown in FIG. 10, the same effect as that of the aircraft control device 300 shown in FIG. 8 can be obtained. In the aircraft control device 300A shown in FIG. 10, a multipath reduction action signal is output only when the reduction action mode is set. Therefore, it is possible to take a multipath reduction action according to the mode setting. For example, in a use case where it is desired to stay on the spot and hover, the reduction action mode may be turned off.

Third Configuration Example of Aircraft Control Device

Figure 12:
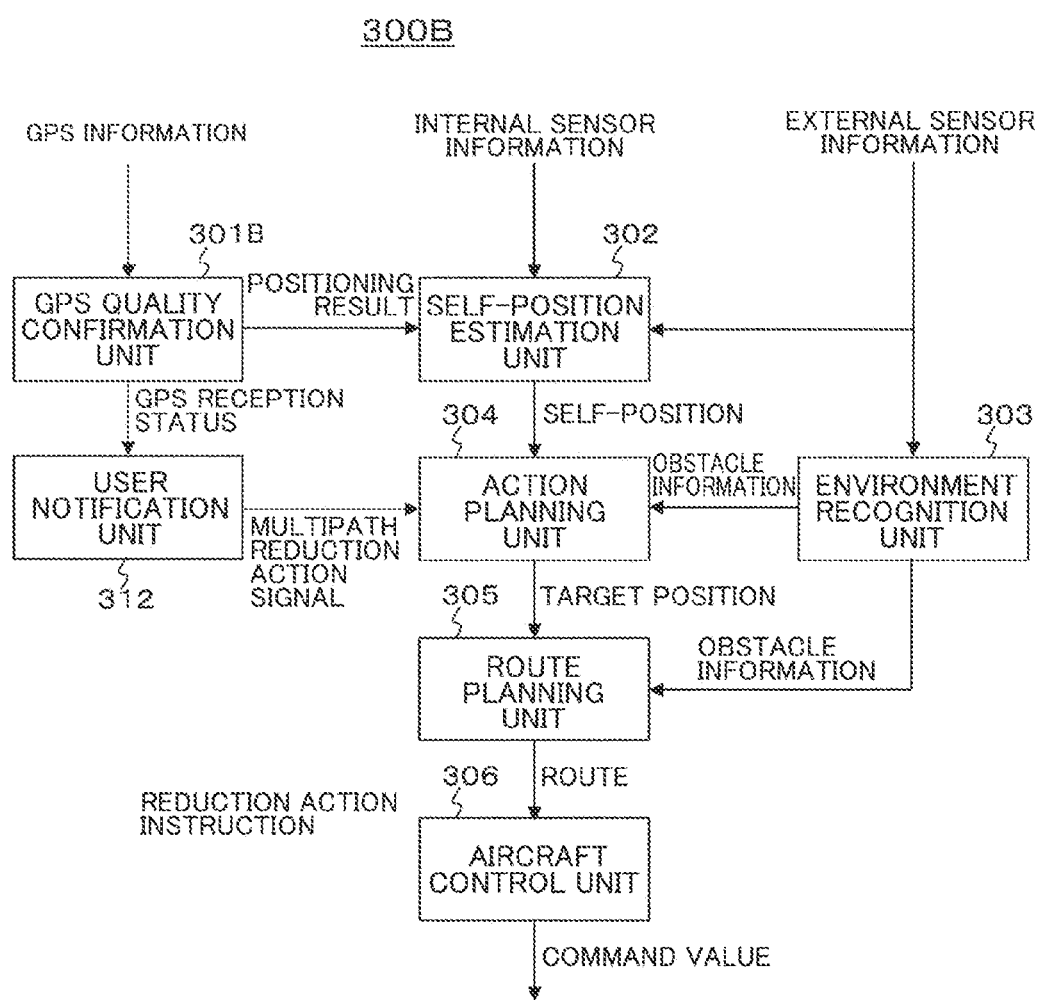
FIG. 12 is a block diagram showing a third configuration example of the aircraft control device.

FIG. 12 shows a configuration example of an aircraft control device 300B included in the control unit 110 of the aircraft (drone) 100. In FIG. 12, the parts corresponding to those in FIG. 8 are designated by the same reference numerals, and detailed description thereof will be omitted as appropriate. The aircraft control device 300B includes a GPS quality confirmation unit 301B, a self-position estimation unit 302, an environment recognition unit 303, an action planning unit 304, a route planning unit 305, an aircraft control unit 306, and a user notification unit 312.

The GPS quality confirmation unit 301 of the aircraft control device 300 of FIG. 8 determines whether the aircraft is in a multipath environment from the GPS reception status (SNR of each satellite signal). If the aircraft is in a multipath environment, the GPS quality confirmation unit 301 outputs and sends a reduced action signal to the action planning unit 304. On the other hand, the GPS quality confirmation unit 301B of the aircraft control device 300B sends the GPS reception status (SNR of each satellite signal) to the user notification unit 312.

The user notification unit 312 determines whether the aircraft is in a multipath environment on the basis of the GPS reception status (SNR of each satellite signal). Then, when the user notification unit 312 determines that the aircraft is in a multipath environment, the user notification unit 312 notifies the user to confirm whether or not to take a multipath reduction action.

In this case, the user is notified when the control unit 110 of the aircraft 100 notifies the controller 200 through the communication unit 120, and the user sends an instruction as to whether or not take a multipath reduction action from the controller 200 to the control unit 110 of the aircraft 100 (see FIG. 6). When there is an instruction as to whether or not to take a multipath reduction action from the user, the user notification unit 312 outputs and sends a multipath reduction action signal to the action planning unit 304. In this sense, the user notification unit 312 constitutes a multipath reduction action signal output unit.

Figure 13:
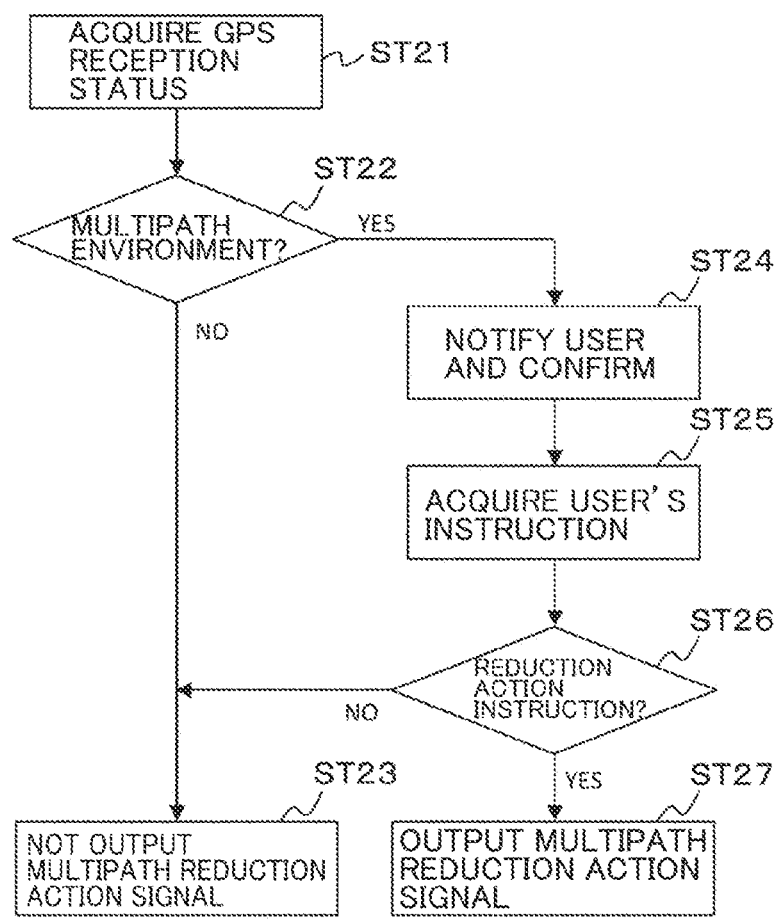
FIG. 13 is a flowchart showing an example of a processing procedure of a user notification unit.

The flowchart of FIG. 13 shows an example of the processing procedure of the user notification unit 312. In step ST21, the user notification unit 312 acquires the GPS reception status supplied from the GPS quality confirmation unit 301A. Next, in step ST22, the user notification unit 312 determines whether the aircraft is in a multipath environment on the basis of the GPS reception status (SNR of each satellite signal). If it is determined that the aircraft is not in the multipath environment, the user notification unit 312 does not output the multipath reduction action signal in step ST23.

On the other hand, when it is determined that the aircraft is in the multipath environment, the user notification unit 312 notifies the user to confirm whether or not to take a multipath reduction action in step ST24. Next, the user notification unit 312 acquires the instruction sent from the user in step ST25. Then, in step ST26, the user notification unit 312 determines whether the instruction is to take the multipath reduction action.

If it is determined that the instruction is not to take the reduction action, the user notification unit 312 does not output the multipath reduction action signal in step ST23. On the other hand, when it is determined that the instruction is to take the reduction action, the user notification unit 312 outputs the multipath reduction action signal in step ST27.

Returning to FIG. 12, although detailed description is omitted, the other parts of the aircraft control device 300B are configured in the same manner as the aircraft control device 300 of FIG. 8 and operate in the same manner.

In the aircraft control device 300B shown in FIG. 12, the same effect as that of the aircraft control device 300 shown in FIG. 8 can be obtained. In the aircraft control device 300B shown in FIG. 12, a multipath reduction action signal is output after notifying the user to obtain a confirmation. Therefore, it is possible to take a multipath reduction action according to the user's intention.

2. Modification

In the above-described embodiment, an example in which the mobile body is the aircraft (drone) 100 is shown. Although detailed description is omitted, the present technology can be similarly applied to other mobile bodies such as vehicles and robots.

The preferred embodiment of the present disclosure has been described in detail with reference to the appended drawings, but the technical scope of the present disclosure is not limited to the example. It should be apparent to those skilled in the art in the technical fields of the present disclosure that various change examples or correction examples can be made within the scope of the technical spirit described in the claims and are, of course, construed to belong to the technical scope of the present disclosure.

Further, the effects described in the present specification are merely explanatory or exemplary and are not intended as limiting. That is, the techniques according to the present disclosure may exhibit other effects apparent to those skilled in the art from the description herein, in addition to or in place of the above effects.

The present technology can be configured as follows.

(1) A mobile body control device including: a self-position estimation unit that estimates a self-position using a positioning calculation result based on a positioning signal transmitted from a satellite; a movement control unit that controls movement of a mobile body on the basis of the self-position; and a multipath reduction action signal output unit that outputs a multipath reduction action signal when the mobile body is in a multipath environment, wherein the movement control unit controls the mobile body so as to take a multipath reduction action when the mobile body is in a predetermined movement state and the multipath reduction action signal is output.

(2) The mobile body control device according to (1), further including: an environment confirmation unit that outputs obstacle information on surrounding obstacles, wherein the movement control unit changes the multipath reduction action on the basis of the obstacle information.

(3) The mobile body control device according to (2), wherein the mobile body is a drone, the predetermined movement state is hovering, and the multipath reduction action is either turning, spiral, or vertical movement.

(4) The mobile body control device according to any one of (1) to (3), further including: a mode setting unit that sets a mode in which the reduction action signal output unit can output the multipath reduction action signal when the mobile body is in the multipath environment.

(5) The mobile body control device according to any one of (1) to (4), further including: a user notification unit that notifies a user to confirm whether the reduction action signal output unit will output the multipath reduction action signal when the mobile body is in the multipath environment.

(6) A mobile body control method including: estimating a self-position using a positioning calculation result based on a positioning signal transmitted from a satellite; controlling movement of a mobile body on the basis of the self-position; and outputting a multipath reduction action signal when the mobile body is in a multipath environment, wherein the controlling movement of a mobile body involves controlling the mobile body so as to take a multipath reduction action when the mobile body is in a predetermined movement state and the multipath reduction action signal is output.

(7) A program for causing a computer to function as: a self-position estimation means for estimating a self-position using a positioning calculation result based on a positioning signal transmitted from a satellite; a movement control means for controlling movement of a mobile body on the basis of the self-position; and a multipath reduction action signal output means for outputting a multipath reduction action signal when the mobile body is in a multipath environment, wherein the movement control means controls the mobile body so as to take a multipath reduction action when the mobile body is in a predetermined movement state and the multipath reduction action signal is output.

REFERENCE SIGNS LIST

10 Aircraft system
100 Aircraft (drone)
101 Camera
104a, 104b, 104c, 104d Rotor
108a, 108b, 108c, 108d Motor
110 Control unit
120 Communication unit
130 IMU
132 Position information acquisition unit
140 Alert generation unit
150 Battery
200 Controller
300, 300A, 300B Aircraft control device
301, 301A, 301B GPS quality confirmation unit
302 Self-position estimation unit
303 Environment recognition unit
304 Action planning unit
305 Route planning unit
306 Aircraft control unit
311 Mode confirmation unit
312 User notification unit

The invention claimed is:

1. A mobile body control device, comprising:
a self-position estimation unit configured to estimate a self-position based on a positioning calculation result, wherein the positioning calculation result is based on a positioning signal transmitted from a satellite;
a movement control unit configured to control movement of a mobile body based on the self-position; and
a multipath reduction action signal output unit configured to output a multipath reduction action signal based on the mobile body is in a multipath environment, wherein the movement control unit is further configured to control the mobile body to take a multipath reduction action based on the mobile body is in a specific movement state and the multipath reduction action signal is output.

2. The mobile body control device according to claim 1, further comprising:
an environment confirmation unit configured to output obstacle information associated with surrounding obstacles, wherein
the movement control unit is further configured to change the multipath reduction action based on the obstacle information.

3. The mobile body control device according to claim 2, wherein
the mobile body is a drone,
the specific movement state is a hovering state, and the multipath reduction action is one of turning, spiral, or vertical movement.

4. The mobile body control device according to claim 1, further comprising:
a mode setting unit configured to set a mode to output the multipath reduction action signal based on the mobile body is in the multipath environment.

5. The mobile body control device according to claim 1, further comprising:
a user notification unit configured to notify, based on the mobile body that is in the multipath environment, a user to confirm output of the multipath reduction action signal by the multipath reduction action signal output unit.

6. A mobile body control method, comprising:
estimating a self-position based on a positioning calculation result, wherein the positioning calculation result is based on a positioning signal transmitted from a satellite;
controlling movement of a mobile body based on the self-position; and
outputting a multipath reduction action signal based on the mobile body is in a multipath environment, wherein the controlling movement of the mobile body comprises controlling the mobile body to take a multipath reduction action based on the mobile body is in a specific movement state and the multipath reduction action signal is output.

7. A non-transitory computer-readable medium having stored thereon, computer-executable instructions which, when executed by a processor, cause the processor to execute operations, the operations comprising:
estimating a self-position based on a positioning calculation result, wherein the positioning calculation result is based on a positioning signal transmitted from a satellite;
controlling movement of a mobile body based on the self-position; and
outputting a multipath reduction action signal based on the mobile body is in a multipath environment, wherein the controlling movement of the mobile body comprises controlling the mobile body to take a multipath reduction action based on the mobile body is in a specific movement state and the multipath reduction action signal is output.

* * * * *